United States Patent
Cases et al.

(10) Patent No.: US 7,944,963 B2
(45) Date of Patent: May 17, 2011

(54) METHOD AND APPARATUS FOR JITTER COMPENSATION IN RECEIVER CIRCUITS USING NONLINEAR DYNAMIC PHASE SHIFTING TECHNIQUE BASED ON BIT HISTORY PATTERN

(75) Inventors: Moises Cases, Austin, TX (US); Daniel N. de Araujo, Cedar Park, TX (US); Bhyrav M. Mutnury, Austin, TX (US); Terence Rodrigues, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 11/966,269

(22) Filed: Dec. 28, 2007

(65) Prior Publication Data

US 2009/0168931 A1 Jul. 2, 2009

(51) Int. Cl.
*H04B 17/00* (2006.01)

(52) U.S. Cl. ........ 375/226; 375/147; 375/229; 375/278; 375/346; 375/348; 375/350

(58) Field of Classification Search .............. 375/226, 375/348, 371
See application file for complete search history.

(56) References Cited

U.S. PATENT DOCUMENTS

| | | | |
|---|---|---|---|
| 6,084,931 A | 7/2000 | Powell, II et al. | |
| 6,384,661 B1 | 5/2002 | Livolsi | |
| 6,545,507 B1 | 4/2003 | Goller | |
| 6,760,389 B1 | 7/2004 | Mukherjee et al. | |
| 6,765,975 B2 | 7/2004 | Dunning et al. | |
| 6,775,301 B1 | 8/2004 | Kroll et al. | |
| 7,113,555 B2 | 9/2006 | Campello de Souza et al. | |
| 7,164,999 B2 * | 1/2007 | Tabatabaei et al. | 702/106 |
| 7,295,642 B2 * | 11/2007 | Xu | 375/373 |
| 7,463,680 B2 * | 12/2008 | Buckwalter et al. | 375/233 |
| 7,609,758 B2 * | 10/2009 | Jungerman | 375/226 |
| 2005/0008085 A1 | 1/2005 | Lee et al. | |
| 2005/0152488 A1 * | 7/2005 | Buckwalter et al. | 375/350 |
| 2006/0227912 A1 | 10/2006 | Leibowitz et al. | |
| 2007/0002941 A1 * | 1/2007 | Low et al. | 375/229 |

OTHER PUBLICATIONS

IPCOM000013760D, "Real-Time Sampling Point Adjustment", pp. 1-3, http://www.ip.com/pubview/IPCOM000013760D, Original Publication Date: Mar. 1, 2001.

* cited by examiner

*Primary Examiner* — Shuwang Liu
*Assistant Examiner* — Dhaval Patel
(74) *Attorney, Agent, or Firm* — Cynthia S. Seal; Hoffman Warnick LLC

(57) ABSTRACT

The present invention provides a simple, easy to implement method and apparatus to reduce jitter in a channel and expand the eye width and eye height of the eye pattern of the signal. The method and apparatus of the present invention reduces jitter specific to a channel in a high speed interface. The present invention utilizes a phasing shifting mechanism based on history of the incoming bits at the receiver. The input bits from the channel are shifted in time before getting to the receiver. This approach significantly reduces Intersymbol Interference (ISI) and deterministic jitter, thus opening up the eye width and eye height for a given interface.

17 Claims, 5 Drawing Sheets

Figure 1 - Eye opening at the receiver without using present invention

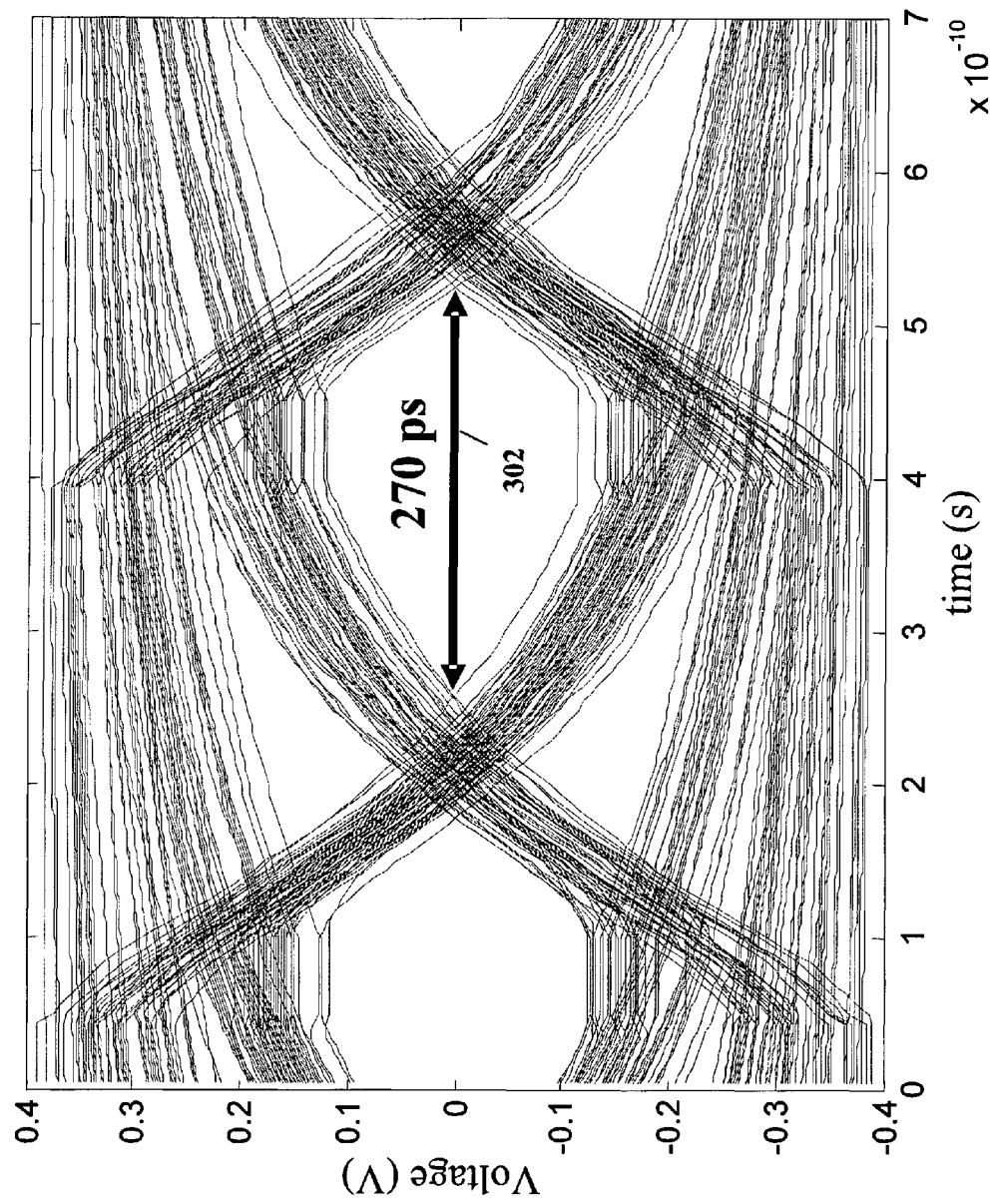
Figure 3 – Eye opening at the receiver using present invention

METHOD AND APPARATUS FOR JITTER COMPENSATION IN RECEIVER CIRCUITS USING NONLINEAR DYNAMIC PHASE SHIFTING TECHNIQUE BASED ON BIT HISTORY PATTERN

BACKGROUND OF THE INVENTION

1. Field of the Invention

The present invention generally relates to jitter compensation in receiver circuits. Specifically, the present invention provides a system and method for jitter compensation in receiver circuits using nonlinear dynamic phase shifting technique based on bit history pattern.

2. Related Art

Intersymbol interference (ISI) is one of the main reasons for jitter in high speed serial links. In telecommunication, ISI means a form of distortion of a signal that causes the previously transmitted symbols to have an effect on the currently received symbol. This is usually an unwanted phenomenon as the previous symbols have similar effect as noise, thus making the communication less reliable. ISI is usually caused by echoes or non-linear frequency response of the channel and results in "jitter" or can be caused by other issues, such as reflections or refractions in the channel, etc. Jitter is an unwanted variation of one or more signal characteristics in electronics and telecommunications. Jitter can also be described as a combination of random and deterministic jitter. Jitter may be seen in characteristics such as the interval between successive pulses, or the amplitude, frequency, or phase of successive cycles. Jitter in high speed electrical interfaces causes uncertainty in the capture of incoming data that may lead to errors. Some of the known solutions to this issue include linear equalization methods such as Feed Forward Equalization (also known as pre-emphasis/de-emphasis), Decision Feedback Equalization (DFE), discrete equalization using RC/RLC networks as well as distributed equalization such as that found in Gore's Eye Opener Plus (EOP) cables address a loss induced by ISI. All these approaches are complex and, most of the time, they compensate attenuation significantly (eye height) and not jitter (eye width). In telecommunication, an eye pattern, also known as an eye diagram is an oscilloscope display in which a digital data signal from a receiver is repetitively sampled and applied to the vertical input, while the data rate is used to trigger the horizontal sweep. It is so called because, for several types of coding, the pattern looks like a series of eyes between a pair of rails. As noted above, jitter is measured by the eye width—not the eye height, which is what the prior art addresses. As shown in FIG. 1, eye pattern 100 has an eye height 102 and an eye width 104. Eye width 104 is shown as having a value of 210 ps (picoseconds).

There is a present need for a simple, easy to implement method and apparatus to reduce jitter in a channel and expand the eye width of the eye pattern.

SUMMARY OF THE INVENTION

In general, the present invention provides a simple, easy to implement method and apparatus to reduce jitter in a channel and expand the eye width and eye height of the eye pattern of the signal.

In the present invention, a method and apparatus reduces jitter specific to a channel in a high speed interface. The present invention utilizes a phasing shifting mechanism based on history of the incoming bits at the receiver. The input bits from the channel are shifted in time before getting to the receiver. This approach significantly reduces Intersymbol Interference (ISI) and deterministic jitter, thus opening up the eye width and eye height for a given interface.

BRIEF DESCRIPTION OF THE DRAWINGS

These and other features of this invention will be more readily understood from the following detailed description of the various aspects of the invention taken in conjunction with the accompanying drawings in which:

FIG. 3 shows a resulting eye pattern (as compared to the eye pattern of FIG. 1) utilizing the apparatus and method of the present invention.

Figure 1:
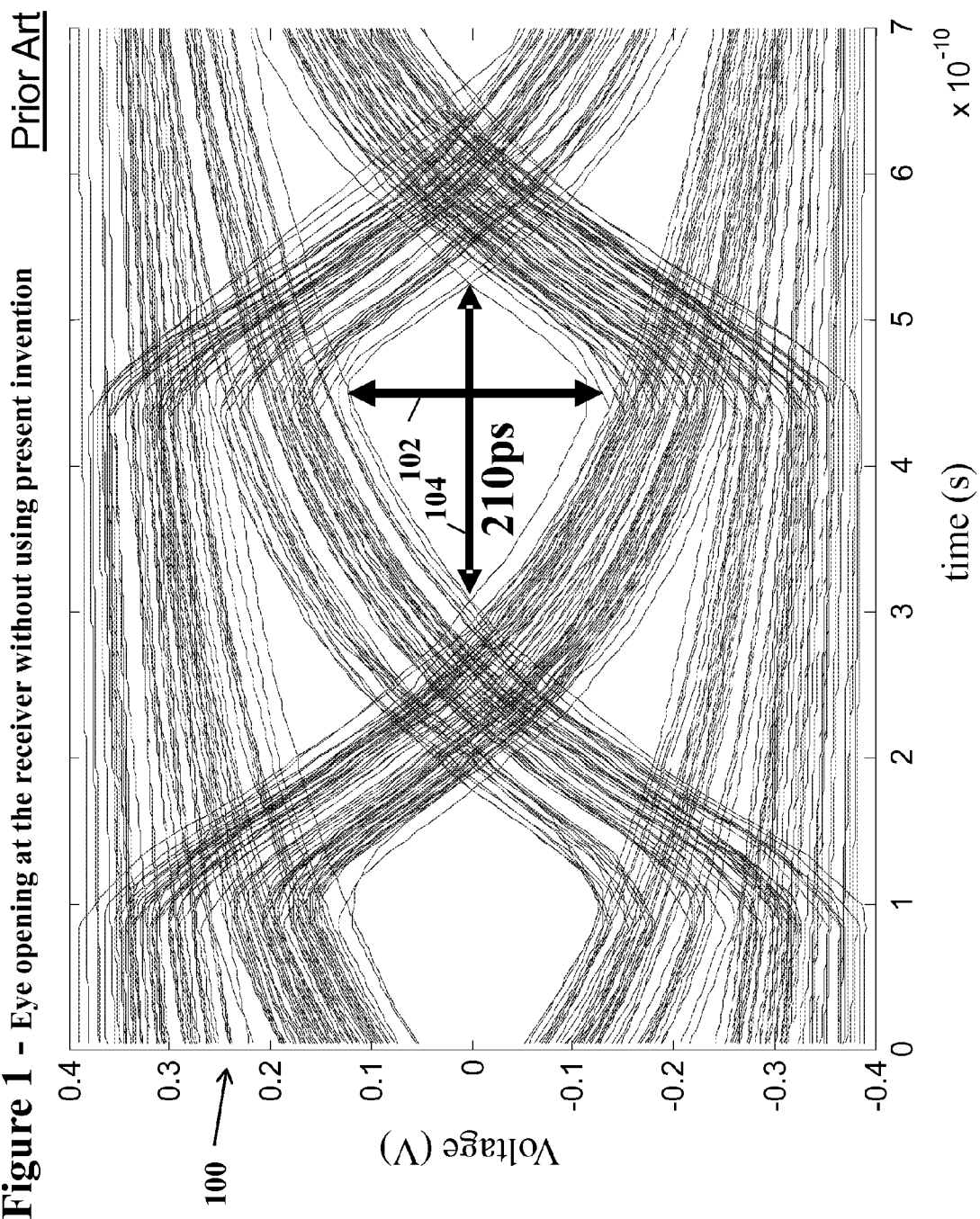
FIG. 1 shows an eye pattern illustrating the eye height and eye width of a stream of data from a channel.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

The present invention provides a way for jitter compensation in receiver circuits using nonlinear dynamic phase shifting technique based on bit history pattern in a high speed interface.

Intersymbol interference is one of the big contributors to jitter in high speed signaling. Jitter is both dependent on bit stream as well as channel topology. In present invention, a method and apparatus reduces deterministic jitter by shifting, in time, the phase of the incoming bits to the receiver based on the history pattern to reduce deterministic jitter. This approach is simple and easy to implement. It is not exhaustive in terms of power consumption as most of the inventions mentioned in the prior art.

Deterministic jitter, as opposed to random jitter, is clock timing jitter or data signal jitter that is predictable and recreatable. The peak-to-peak value of this jitter is bounded, and the bounds can easily be observed and predicted. Deterministic jitter is a type of jitter and under this type are different categories. Periodic jitter, data-dependent jitter, and duty-cycle dependent jitter are types of deterministic jitter. The system and method of the present invention use this predictability to reduce deterministic jitter by examining the history and predicting future jitter in order to compensate for it.

Figures 2, 2A:
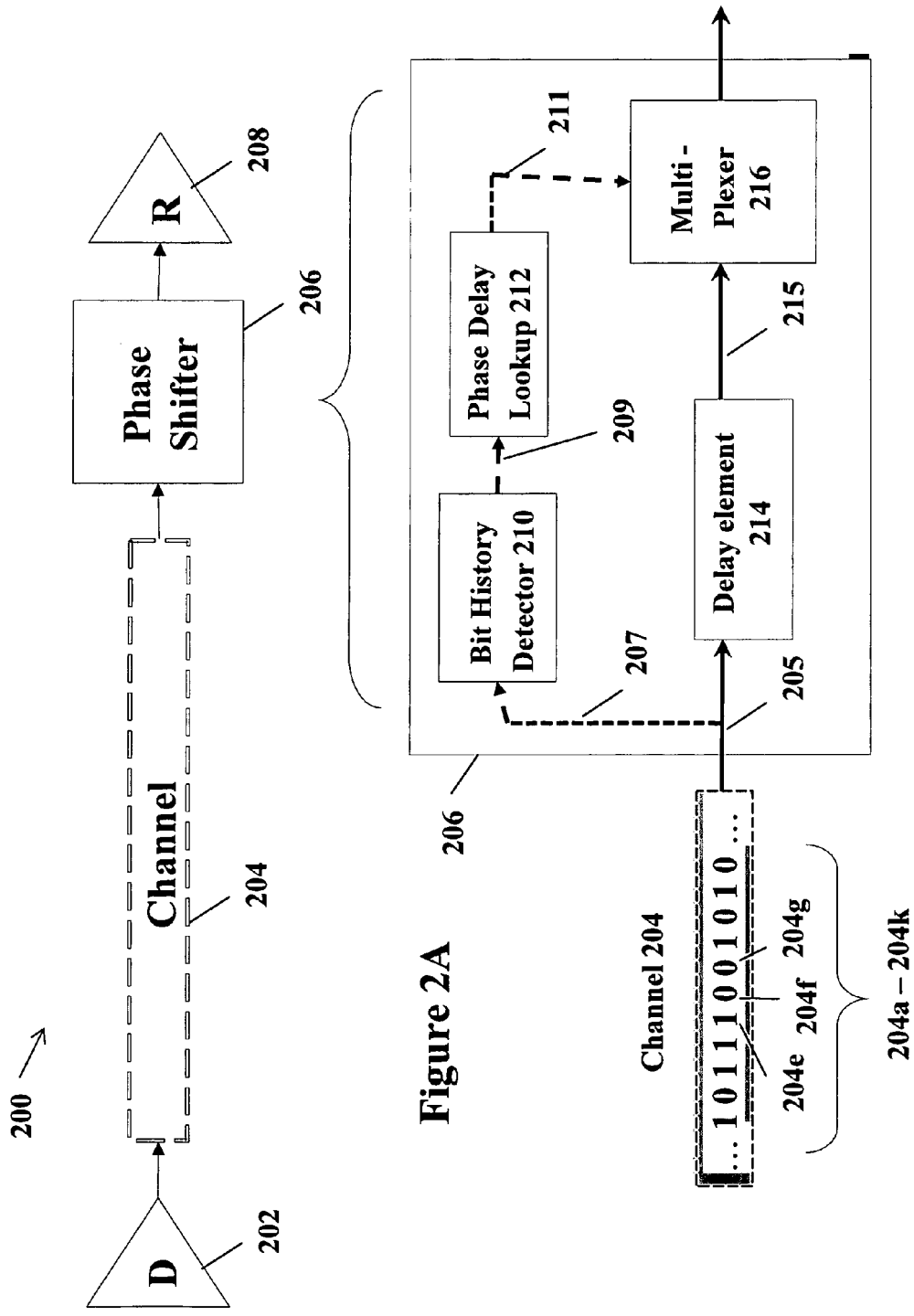
FIG. 2 shows an embodiment of the apparatus of the present invention with FIG. 2A showing more detail of the phase shifter of the present invention.

An implementation of the system 200 of the present invention is shown in FIG. 2. The signal is received by decoder D 202 and is passed to channel 204. The decoder can be a transmitter, a driver, an ASIC, etc., as well. From there, the data stream is passed to phase shifter 206 and then on to the receiver R 208. Channel 204 and phase shifter 206 are shown in greater detail in FIG. 2A. Channel 204 passes a bit stream having bits 204a-204k to phase shifter 206. Phase shifter 206 comprises a bit history detector 210, a phase delay look-up table 212, a delay element 214 and a multiplexor 216.

The bit stream 204a-204k is passed along bit stream path 205 to the delay element 214 which delays the bit stream providing time for bit stream information to be determined by the bit history detector 210 and a phase delay look-up table 212. After a delay, the delay element 214 passes the bit stream 204a-204k to multiplexor 216 along bit stream path 215. The bit history detector 210 monitors, off of bit stream path 205, the bit polarity of the bit stream 204a-204k via bit polarity path 207 to create bit polarity information on each of the bits of the bit stream 204a-204k. The bit history detector 210 passes on the bit polarity information to the phase delay look-up table 212 along bit polarity information path 209 to phase delay look-up table 212. The phase delay look-up table 212 determines whether two or more consecutive bits with same polarity make a transition to opposite polarity (see bit stream 204a-204k where bit 204g (0)→204f (0)→204e (1)), the phase delay look-up table 212 selects the phase delay value for that particular transition. The phase delay value is generally programmable but one common method is for the delay value to increase as the number of consecutive bits with same polarity before a transition to opposite polarity increases. The phase delay value is passed along phase delay value path 211 to multiplexor 216. The multiplexor 216, which also receives the bit stream 204a-204k, uses the phase delay value to delay the bit stream 204a-204k based upon the phase delay value. The resulting multiplexed bit stream has a reduced jitter and is passed to the receiver 208.

The phase delay look-up table 212 can be configured to have multiple taps for various bit transitions. Each tap would have its own bit history detector tapped into various spots along the channel 204 so that the bit stream can be examined in various spots. This way, the system can "look ahead" and make decisions more quickly. Alternatively, previous bit streams having similar bit transitions can be used to make delay decisions. For instance, given three bits streams:

a. . . . 010110 . . .
b. . . . 000110 . . .
c. . . . 100110 . . .

All three bit streams have the "110" bit pattern (shown in bold) but each have different prior three bits. In this example two tap system, it may be programmed so that the previous bit patterns may be used to make phase delay decisions, e.g., the phase decision for bit pattern c may be made based upon the phase delay decisions made for bit patterns a and b. "n" number of taps back may be used as well depending upon the user's choice.

Figure 4:
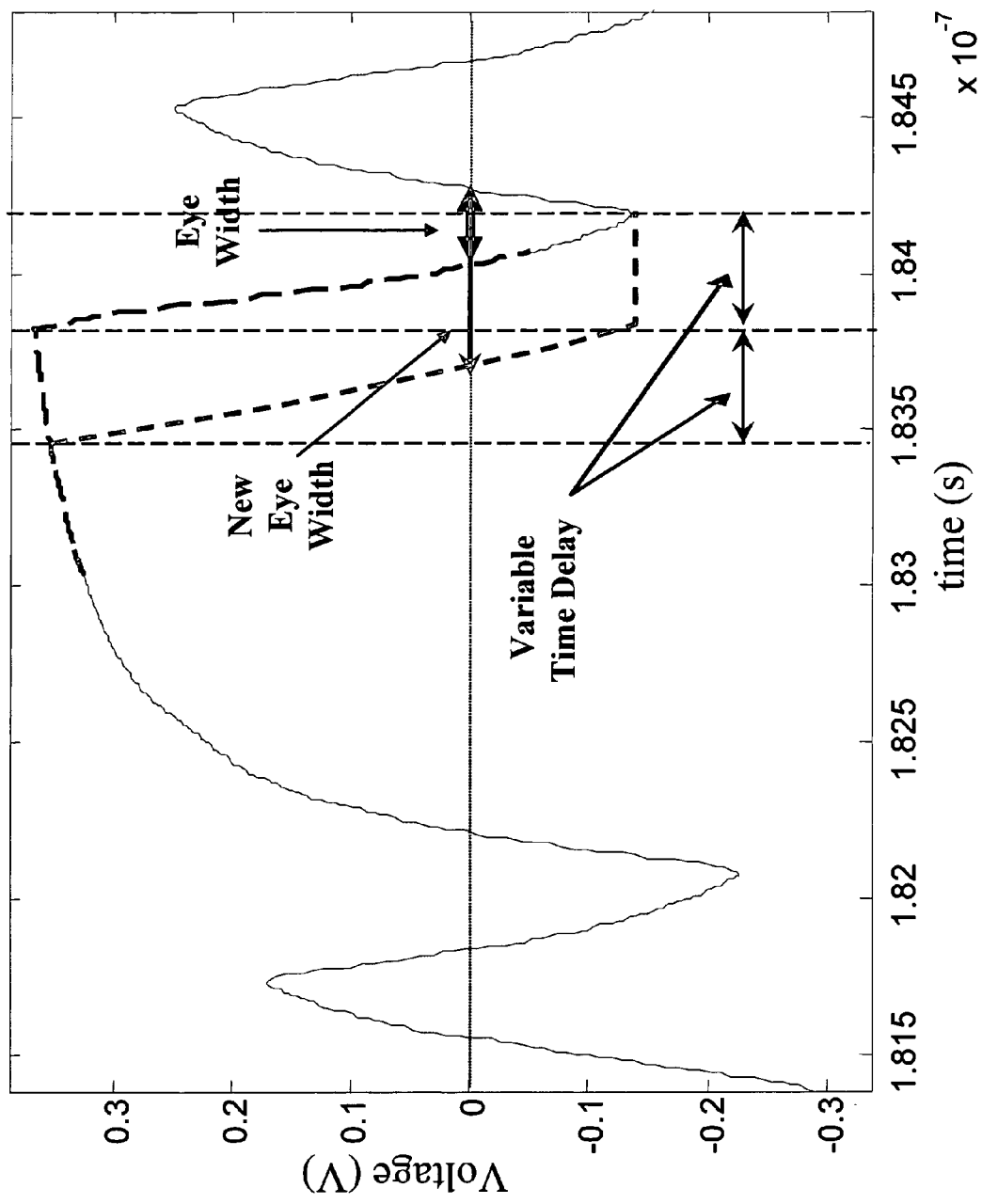
FIG. 4 shows an improved eye pattern resulting from use of the apparatus and method of the present invention.
Figure 5:
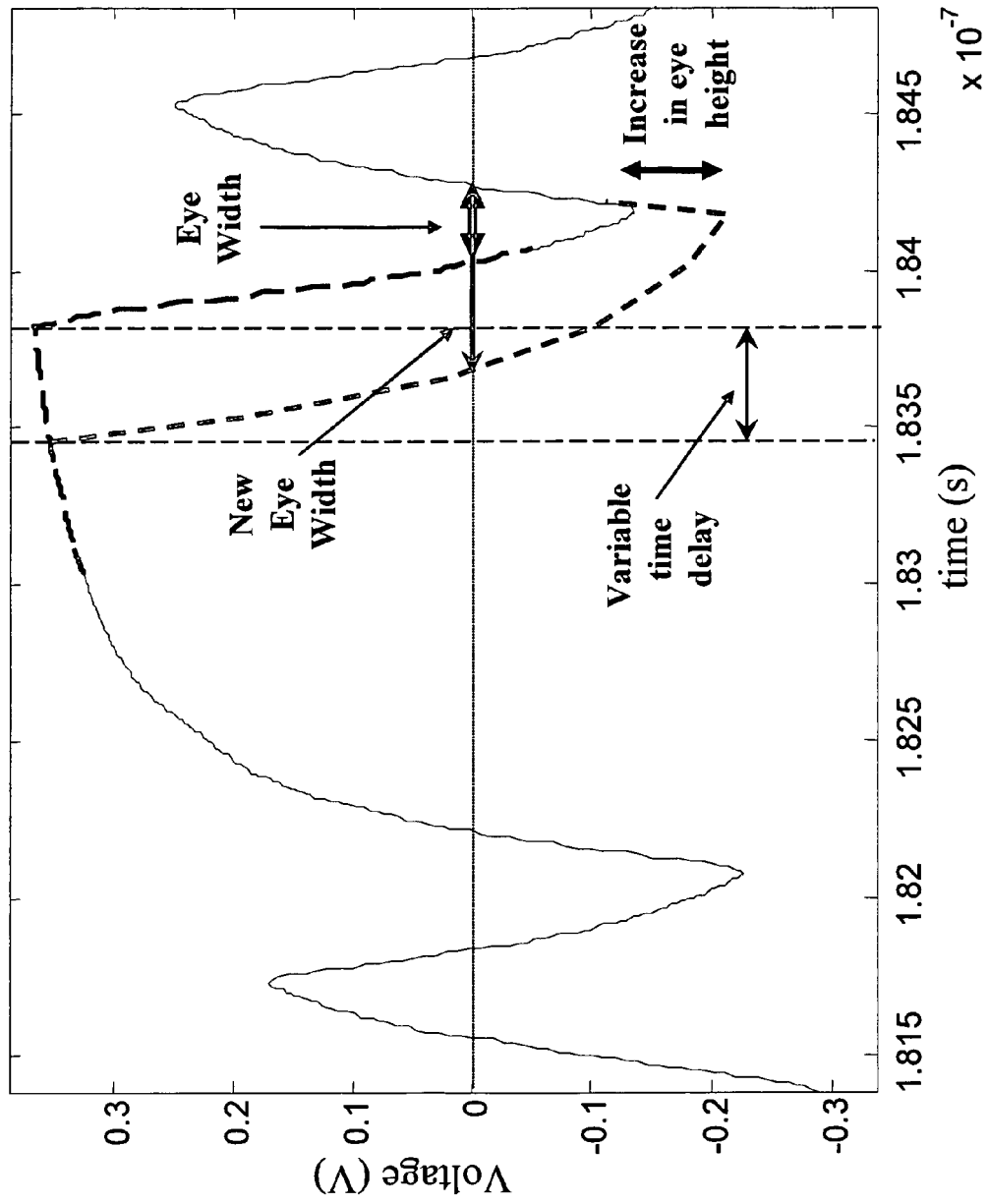
FIG. 5 shows another improved eye pattern resulting from use of the apparatus and method of the present invention.

FIG. 4 and FIG. 5 show the results of two embodiments, where, depending on the bit history, the next bit transition starts ahead of time to ensure better eye opening at the receiver. It can be seen that whenever the bits have same polarity for two or more cycle periods, the next bit transition is started ahead of time to improve the signal quality. The eye opening improves significantly using this approach. As seen in FIG. 4, the eye opening width is wider utilizing the system and method of the present invention as new eye width is wider than eye width. By programming the phase delay lookup table, variable time delay can be controlled. Variable time delay shows the plateau time of the bit stream. FIG. 5 shows that the phase delay lookup table can be programmed to allow the eye opening to have a greater height.

A simple 1-tap phase shifting approach model going two bits back in history is implemented for a 50 inch lossy channel (FIG. 1 and FIG. 3). It can be seen that using the proposed invention there is a significant reduction in the amount of jitter (FIG. 3). The eye width 302 using the present invention is 270 ps as compared to 210 ps of the prior art resulting in a 60 ps improvement over 210 ps is approximately 29% improvement.

It should be understood that the present invention is typically computer-implemented via hardware and/or software. As such, client systems and/or servers will include computerized components as known in the art. Such components typically include (among others), a processing unit, a memory, a bus, input/output (I/O) interfaces, external devices, etc. It should also be understood that although a specific embodiment involving hardware has been depicted and described, the present invention could be implemented in software form.

While shown and described herein as a system and method for compensating jitter in receiver circuits using a nonlinear dynamic phase shifting technique based upon bit history pattern between a decoder and receiver, it is understood that the invention further provides various alternative embodiments. For example, in one embodiment, the invention provides a computer-readable/useable medium that includes computer program code to enable a computer infrastructure to compensating jitter in receiver circuits using a nonlinear dynamic phase shifting technique based upon bit history pattern between a decoder and receiver. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In still another embodiment, the invention provides a computer-implemented method for compensating jitter in receiver circuits using a nonlinear dynamic phase shifting technique based upon bit history pattern between a decoder and receiver. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A system for compensating jitter in receiver circuits using a nonlinear dynamic phase shifting technique based upon bit history pattern between a decoder and receiver, the system comprising a phase shifter for receiving an original bit stream having bit transitions from the decoder, the phase shifter comprising a bit history detector, a phase delay look-up table, a delay element and a multiplexor, the delay element for receiving an undelayed bit stream and delaying the undelayed bit stream and passing the delayed bit stream to the multiplexor, the bit history detector for inspecting the undelayed bit stream, for detecting a bit transition in the undelayed bit stream after at least two consecutive bit non-transitions, for passing bit transition information of the undelayed bit stream to the phase delay look-up table, the phase delay look-up table for selecting a phase delay value based upon the bit transition information and passing the phase delay value to the multiplexor, the multiplexor for delaying the delayed bit stream based upon the phase delay value and passing the delayed bit stream to the receiver;
  wherein the phase delay decision for a given bit stream is based upon the phase delay decisions for at least one previous bit stream having the same bit pattern of consecutive non-transitions and based upon the history of bits prior to the bit pattern of consecutive non-transitions of the at least one previous bit stream.

2. The system of claim 1 further comprising a channel between the decoder and the phase shifter for channeling the original bit stream.

3. The system of claim 1 wherein the phase delay value is programmable.

4. The system of claim 1 wherein the phase delay is based upon the number of non-transitions occurring prior to the transition.

5. The system of claim 2 wherein the system has multiple taps, each tap having a bit history detector for detecting bit transitions along the channel so that the system can look ahead at the bit stream.

6. The system of claim 1 wherein the decision is weighted depending upon which of the history of prior bits is being examined.

7. A method for compensating jitter in receiver circuits using a nonlinear dynamic phase shifting technique based upon bit history pattern between a decoder and receiver, the receiver circuit having a phase shifter having a bit history detector, a phase delay look-up table, a delay element and a multiplexor, the method comprising the steps of:
  [a.] receiving, at the phase shifter, an original bit stream having bit transitions from the decoder;
  [b.] receiving, at the delay element, an undelayed bit stream;
  [c.] delaying, at the delay element, the undelayed bit stream;
  [d.] passing, from the delay element, the delayed bit stream to the multiplexor;
  [e.] inspecting, by the bit history detector, the undelayed bit stream;
  [f.] detecting, by the bit history detector, a bit transition in the undelayed bit stream after at least two consecutive bit non-transitions;
  [g.] passing, by the bit history detector, bit transition information of the undelayed bit stream to the phase delay look-up table;
  [h.] selecting, by the phase delay look-up table, a phase delay value based upon the bit transition information;
  [i.] passing, from the phase delay look-up table, the phase delay value to the multiplexor;
  [j.] delaying, by the multiplexor, the delayed bit stream based upon the phase delay value;
  [k.] passing, from the multiplexor, the delayed bit stream to the receiver; and
    examining previous bit streams having the same bit pattern of non-transitions and further comprising the step of examining bit transitions occurring prior to the bit pattern of non-transitions of the previous bit streams and further comprising the step of making the phase delay decision based upon the examinations.

8. The method of claim 7 wherein the receiver circuit further has a channel, the method further comprises the step of channeling, by the channel, the original bit stream between the decoder and the phase shifter.

9. The method of claim 7 wherein the phase delay value is programmable.

10. The method of claim 7 wherein the phase delay is based upon the number of non-transitions occurring prior to the transition.

11. The method of claim 8 wherein the receiver circuit has multiple taps, each tap having a bit history detector, the method further comprising the step of detecting bit transitions along the channel so that the receiver circuit can look ahead at the bit stream.

12. The method of claim 7 wherein the phase delay decision is weighted based upon the examinations.

13. A computer program product comprising a non-transitory computer readable storage medium including computer usable program code for implementing a method for compensating jitter in receiver circuits using a nonlinear dynamic phase shifting technique based upon bit history pattern between a decoder and receiver, the receiver circuit having a phase shifter having a bit history detector, a phase delay look-up table, a delay element and a multiplexor, the method comprising the steps of:
  [a.] receiving, at the phase shifter, an original bit stream having bit transitions from the decoder;
  [b.] receiving, at the delay element, an undelayed bit stream;
  [c.] delaying, at the delay element, the undelayed bit stream;
  [d.] passing, from the delay element, the delayed bit stream to the multiplexor;
  [e.] inspecting, by the bit history detector, the undelayed bit stream;
  [f.] detecting, by the bit history detector, a bit transition in the undelayed bit stream after at least two consecutive bit non-transitions;
  [g.] passing, by the bit history detector, bit transition information of the undelayed bit stream to the phase delay look-up table;
  [h.] selecting, by the phase delay look-up table, a phase delay value based upon the bit transition information;
  [i.] passing, from the phase delay look-up table, the phase delay value to the multiplexor;
  [j.] delaying, by the multiplexor, the delayed bit stream based upon the phase delay value;
  [k.] passing, from the multiplexor, the delayed bit stream to the receiver; and
    examining previous bit streams having the same bit pattern of non-transitions and further comprising the step of examining bit transitions occurring prior to the bit pattern of non-transitions of the previous bit streams and further comprising the step of making the phase delay decision based upon the examinations.

14. The computer program product of claim 13 wherein the receiver circuit further has a channel, the method further comprises the step of channeling, by the channel, the original bit stream between the decoder and the phase shifter.

15. The computer program product of claim 13 wherein the phase delay value is programmable.

16. The computer program product of claim 13 wherein the phase delay is based upon the number of non-transitions occurring prior to the transition.

17. The computer program product of claim 14 wherein the receiver circuit has multiple taps, each tap having a bit history detector, the method further comprising the step of detecting bit transitions along the channel so that the receiver circuit can look ahead at the bit stream.

* * * * *